United States Patent
Twell

(10) Patent No.: US 9,301,078 B2
(45) Date of Patent: Mar. 29, 2016

(54) NETWORK-INTELLIGENT SCANNER

(75) Inventor: Timothy J Twell, Ipswich (GB)

(73) Assignee: British Telecommunications PLC, London (GB)

( * ) Notice: Subject to any disclaimer, the term of this patent is extended or adjusted under 35 U.S.C. 154(b) by 1703 days.

(21) Appl. No.: 12/594,707

(22) PCT Filed: Feb. 15, 2008

(86) PCT No.: PCT/GB2008/000530
§ 371 (c)(1),
(2), (4) Date: Oct. 5, 2009

(87) PCT Pub. No.: WO2008/122750
PCT Pub. Date: Oct. 16, 2008

(65) Prior Publication Data
US 2010/0136953 A1   Jun. 3, 2010

(30) Foreign Application Priority Data
Apr. 5, 2007 (EP) ..................... 07251521

(51) Int. Cl.
H04M 3/42 (2006.01)
H04W 4/00 (2009.01)
H04W 28/06 (2009.01)
H04W 48/16 (2009.01)
H04W 84/18 (2009.01)
H04W 52/02 (2009.01)

(52) U.S. Cl.
CPC ............... *H04W 4/00* (2013.01); *H04W 28/06* (2013.01); *H04W 48/16* (2013.01); *H04W 52/0229* (2013.01); *H04W 84/18* (2013.01)

(58) Field of Classification Search
USPC ................. 455/414.1, 414.2; 379/201.01
See application file for complete search history.

(56) References Cited

U.S. PATENT DOCUMENTS

2003/0128741 A1 * 7/2003 Chun ........................... 375/132
2004/0085947 A1   5/2004 Ekberg et al.

FOREIGN PATENT DOCUMENTS

| EP | 1 355 448 A | 10/2003 |
| EP | 1 370 050 | 12/2003 |

(Continued)

OTHER PUBLICATIONS

European Search Report dated Sep. 7, 2007 in EP 07 25 1521.

(Continued)

Primary Examiner — Kent Chang
Assistant Examiner — Scott Au
(74) Attorney, Agent, or Firm — Nixon & Vanderhye PC

(57) ABSTRACT

A piconet communications system (e.g. Bluetooth®) is used to distribute information to mobile user devices 1 which advertise (10) that they require the information available. In a reversal of the conventional information provision protocols, the information provider 2 scans for user devices receptive to such data (21), and transmit the required data (27), only to such devices that require it. The information provider 2 also has provision to ensure that it transmits the information to each user device only once (step 26). By having the information provider performing the scanning, and only transmitting data to user devices that have indicated they will accept it, and have not already received it, the power consumption of the mobile devices is minimized as they do not need to perform any scanning or information-filtering operations, these being performed by the fixed information provider terminal.

19 Claims, 7 Drawing Sheets

(56) References Cited

FOREIGN PATENT DOCUMENTS

| | | |
|---|---|---|
| JP | 2007-028304 | 2/2007 |
| KR | 2002 0053497 | 7/2002 |

OTHER PUBLICATIONS

International Search Report for PCT/GB2008/000530, mailed Jul. 17, 2008.

* cited by examiner

NETWORK-INTELLIGENT SCANNER

This application is the U.S. national phase of International Application No. PCT/GB2008/000530 filed 15 Feb. 2008, which designated the U.S. and claims priority to European Application No. 07251521.6, filed 5 Apr. 2007, the entire contents of each of which are hereby incorporated by reference.

The invention relates to the field of mobile communications, and more specifically to systems for notifying a mobile device of the availability of services in the vicinity of the device.

Many modern mobile devices have access both to the normal cellular mobile network and also to other means of wireless communication which they can use to transmit and receive data when they are within range of a suitable access point, such as the ad hoc short range wireless interconnectivity system developed under the Trade Mark Bluetooth®, and the so-called "WiFi" system developed under IEEE standard 802.11. Finding and gaining access to those networks is an important factor in fully exploiting their availability.

The Bluetooth version 1.0 specification was agreed in July 1999. It is described in Ericsson Review No 3, 1998, Jaap Haartsen, "*BLUETOOTH—The universal radio interface for ad hoc, wireless connectivity*". The Bluetooth system uses radio interfaces in the 2.45 GHz frequency band to allow suitably equipped portable electronic devices to connect and communicate wirelessly via short-range ad hoc networks. Such networks are referred to in that article, and in this specification, as "piconets". This system was designed to replace cables between portable consumer devices such as cellular telephones, headsets, laptop computers, personal digital assistants, digital cameras, and many other products, but has found a number of other applications. Each unit can simultaneously communicate with several other units.

According to the Bluetooth system, interactions between devices are established using a discovery protocol initiated by devices 'publishing' the capabilities that they can offer. The device creates a record indicating that it is able to provide the particular service, and giving a description of the details of this particular instance of the service. So, as an example of normal use, a bluetooth print service might indicate that it can print documents, and that it is a fast laser printer. A user requiring a particular service causes his device to transmit a scanning signal (known as a "Service Discovery Request") for a specified service type (for example a printer), and any other device which is within range and holds a record indicating that it is capable of providing the specified service responds to the scan. The user's device can then select, from the responses it receives, the one most suitable for its purpose, based on the advertised factors such as speed, cost, signal quality etc.

U.S. Pat. No. 6,968,178 describes an advertising system in which a service provider can advertise services to mobile devices via a Bluetooth connection. In such existing systems each access point (or "beacon") maintains a record indicative of the services it can provide, and suitably configured mobile devices regularly scan for access points providing a desired service. If a mobile device performs a scan when it is close to such an access point, the access point responds with information alerting the user to the services provided by the access point. Similar alerts are also used to advertise the availability of other goods and services to passers-by. If the user wants to know more he can respond via Bluetooth and get further information from the advertiser.

A particular example of this type of service is described in European Patent Application EP1355448. In this reference, an access point uses Bluetooth to advertise the availability of internet connectivity to any mobile terminals within range.

However, such an arrangement can be intrusive, as well as wasteful of battery power in the mobile device, because many of these alerts will be for services not currently required by the user. The nuisance factor is ameliorated in the aforementioned patent U.S. Pat. No. 6,968,178 by providing the user device with a filter that prevents display of advertisements that are of no interest to the user, but the mobile unit still expends processing time and battery power receiving the unwanted advertisements, and performing the analysis necessary for the filtering process.

It is known from United States Patent Application US2004/0085947 for a fixed terminal to generate a general inquiry access code to which mobile terminals in the vicinity respond with details of applications already available to them, so that the fixed terminal can download any additional applications or updates to the existing ones. However, this download takes place without any active intervention from the mobile unit to determine whether the user needs the applications that are to be downloaded, again resulting in unnecessary processing time and battery usage.

The present invention employs a novel method of using such protocols which reduces these disadvantages. Although the embodiment will be described with reference to Bluetooth protocols, the invention is not limited to this system and is applicable to any protocol operating in a similar way.

According to a first aspect of the present invention there is provided a communications device having data generation means for generating a transmittable request for specified data, a receiver for detecting a scanning signal generated by a corresponding communications devices, a transmitter for transmitting the request for data to a corresponding communications device in response to a scanning signal received from the corresponding communications device, and a receiver to receive the required data from the corresponding communications device. Such devices will be referred to herein as devices of a first type.

According to a second, complementary, aspect there is provided a communications device for transmitting data to a corresponding device, comprising a scanner for generating and transmitting a scanning signal which, on detection by a corresponding device, will cause the corresponding device to transmit a request for specified data, a receiver for receiving and processing such requests, and data transmission means responsive to requests processed by the receiver for transmitting the required data to the corresponding device. Such devices will be referred to herein as devices of a second type.

According to a third aspect there is provided a method of operating a wireless communications system wherein at least one device of a first type generates a transmittable request for specified data, at least one device of a second type generates and transmits a scanning signal which, on detection by a device of the first type, causes the device of the first type to transmit the request, and on receiving the request the device of the second type transmits the required data.

Preferably devices of the first type are mobile devices with an internal power supply and devices of the second type are fixed devices connected to an external power supply. In the following description, devices of the first and second types will be referred to as user devices and information providers respectively.

In a preferred embodiment, the communications system is a piconet operating a reversed service-discovery protocol, wherein the device of the first type operates as a server, providing a service as a receiver of information, and the device of the second type acts as a client seeking such a service.

Preferably, a device of the second type maintains a record of the identities of each device of the first type to which it transmits data, and in the event of a subsequent request being received from a device of the first type whose identity has been so recorded, the device of the second type does not transmit the same data to the device of the first type.

In the preferred embodiment, if the device of the second type fails to make contact with a device of the first type with which it has previously made contact after a predetermined number of attempts, it removes the device of the first type from the record so that it can resume transmitting data to the device of the first type should it subsequently be re-discovered.

The data to be transmitted may relate to any information that the user of the device of the first type may wish to receive. For example, the specified data may be configuration data to be used by the device to run a predetermined application. This data may be specific to the user or the device, or may be of general application. In one embodiment, which is not limitative, the configuration data is used for wireless connection of a mobile user terminal associated with the device of the first type to a wireless access point associated with the device of the second type. Other possible uses will be discussed briefly at the end of this specification.

Thus, the mobile device generates a transmittable request for the information it requires, which causes the mobile device to respond to scans from information providers operating a piconet protocol indicating that they have the requested information. Each information provider periodically scans for such mobile devices. This takes the form of a 'broadcast' giving only the fact that it is an information provider, and a return address. Additionally it might send some kind of mutually recognised 'token' to prove that it is genuine. A mobile device recognising this type of information provider responds by transmitting its publishable request, which takes the form of a brief 'profile' of the type of information it will accept, and its return address. It may also return an equivalent 'token' to prove that it also is genuine.

Thus the present invention reverses the conventional method of piconet operation, such as the Bluetooth Service Discovery protocol, in which a "client" device seeking information scans for a server that will provide it, and a "server" device responds to such scans by offering information. Instead, the mobile device seeking information acts as a server, offering to receive information of a specified type. The "client" is the information provider, which seeks mobile devices that are offering to receive the information. Effectively the mobile device advertises to the client that it is receptive to a specified class of information. This ensures that only relevant data, about services that the device actually requires, is passed to each mobile device. In one embodiment the information sought relates to application configuration and URLs/credentials of WiFi access points that the user may require, but the invention may be used for any selective information transfer. Only mobile devices that recognise the exact scanning signal (Service Discovery Request) being broadcast and that currently have a transmittable request need respond. This minimises power consumption on the mobile devices, because minimal transmission is made unless the required information is available.

The response generated by the mobile device is in the form of a 'profile' of the type of notification the device requires, (offers to accept) together with the return address to which the information should be sent. This profile may be viewed as a transfer of the user's filtering process to the information provider: the information provider effectively requests delivery of the user's filter criteria, so that the information provider can then use the filter to select the data that the mobile device requires.

On receiving an appropriate profile from the mobile device the information provider can transmit the information required. This information may be of any kind, according to criteria specified by applications running on the user device, possibly in accordance with preferences expressed by the user himself. The information may be configuration data for one or more applications to be run on the mobile device. In one embodiment the data comprises information necessary to allow the mobile device to set up a communications connection between the device and an access point associated with the information provider. This communications connection may use any suitable protocol, for example the "wi-fi" or 802.11 protocol. The use of the reversed piconet scanning protocol to initiate the connection limits the power consumption used in identifying suitable connections.

Having once identified a mobile device offering the information receiving "service", the information provider does not exchange further contact details when it identifies the same device on subsequent scans unless it has new information. If the device is not identified on a subsequent scan (or a predetermined number of such scans) and is then re-discovered, the contact details are renewed. A mobile device therefore receives just one notification from each information provider each time it comes within range.

Thus the mobile devices are sought by the information providers, and are only given information which they have indicated that they require. A mobile device can therefore be notified about services or products efficiently using a piconet link. Information is not sent to the mobile devices indiscriminately, but is only sent to those devices to which it is relevant. This greatly reduces the processing load on each such device. Another advantage is that the communications are so arranged as to minimise power consumption on the mobile device, by minimising the amount it must transmit in order to receive only the information it requires, pushing most of the load onto the information provider. This is of greatest advantage when, as is usually the case, the user device is battery operated device and the information provider has a mains supply. Nevertheless the invention can, of course, be used with user terminals having external power supplies.

The initial signal (scan) generated by the information provider only indicates that the information provider seeks user devices that require the information it can provide. The user device therefore only makes transmissions in response to an information providers claiming, in the right manner, that it has information that the user device requires. This minimises power wastage in unnecessary transmissions, and also in receiving and filtering unwanted messages. The request the user device sends to the information provider is only sent if the user wants the information, and is a very small amount of data as part of the service description response in the Bluetooth protocol.

The information provider is configured to detect such request data in order to identify user devices which require data to be sent to it.

The information provider customises the response to be sent to the user device by sending only relevant information (or none, if none is relevant, thereby minimising power consumption on the mobile device). The user device does not, and does not need to, perform any filtering for unwanted information: any items sent to it will meet the criteria set in its initial advertisement. In the preferred embodiment, the information provider will also avoid sending duplicate information to the user device, which further saves power and reduces processing.

No negotiation dialogue is necessary to determine the best or available service. The user device merely specifies restrictions on what it requires, and the information provider sends it information meeting those requirements.

In general the user device will only have to deal with one information provider at any one time, as their scanning cycles are independent. If the device is presented with conflicting information from more than one information provider, for instance relating to different wireless access points, it may select one or another based upon criteria such as information it has previously received, or by offering a choice to the user. Having received information from one information provider, the user device may also change the "advertisement" to set new criteria for the information it will accept. For example, if a user device is already in wifi communication with one access point, the criteria set by the user device for information it will accept can be specified such as to include only information relating to access points which would provide a better (faster, cheaper, etc) service.

In one embodiment, the initial scan by an information provider simply alerts the user device to the presence of the information provider. In this situation, when a user device responds to a scan from an information provider by giving an indication that it will accept information meeting certain characteristics, it does not, at that stage, have any indication as to what information might be offered to it. The user device response indicates what information it needs.

The device minimises the amount of power it uses, because it is usually only listening, not making scans and requests to find information and services. However, it maintains a minimal level of interaction with the notification service, (e.g. keeping its Bluetooth receiver turned on) to minimise the delivery and processing of unnecessary information. The information-selection processing load and most of the transmission power load, is devolved to the notification service device.

Information to be sent could be anything, e.g. a local URL to a web browser, a SIP registration server address to a SIP VoIP client, the local time of day to a clock/calendar, etc. In the embodiment to be described, the information relates to an access point, probably in the standard form of a URL; although it could be a structure of net name and login IDs, and includes access or authentication tokens required to set up a required communications link. These access-point details are only transmitted (by means of the service response) to approved, properly-identified and properly-registered recipients. The information relating to these access details is tailored to the device by the notification service e.g. different login details or URLs for different devices according to registered details, language, etc.

This invention allows the provision of notification to mobile devices of the availability of a wireless network and of services available through it, without the mobile device having repeatedly to search for them. By transferring the discovery load from the mobile device to a server, where electrical power and CPU loading are more readily available, the power drain on the mobile device is minimised.

The invention also allows a wireless network service that has a discovery protocol, such as Bluetooth, to find other network services that do not necessarily have such discovery protocols (WiFi, IR, VoIP, SIP). This can be achieved by publishing information indicative of these capabilities in the discovery protocol. The mobile device does not have to be configured with details of the server with which it is to register, or to perform any search operation. If a device is running an application in accordance with the invention and advertising for data downloads, it will receive any appropriate notifications of available network access points. The invention does not obstruct normal notification mechanisms so devices not featuring the invention can nevertheless be sent information from the information providers using conventional means (such as OBEX push) if the notification system determines that it would be appropriate to do so.

Two embodiments of the invention will now be described, by way of example, with reference to the drawings, in which FIG. 1 is a schematic diagram illustrating the various devices which co-operate to perform the invention.

Figure 4:
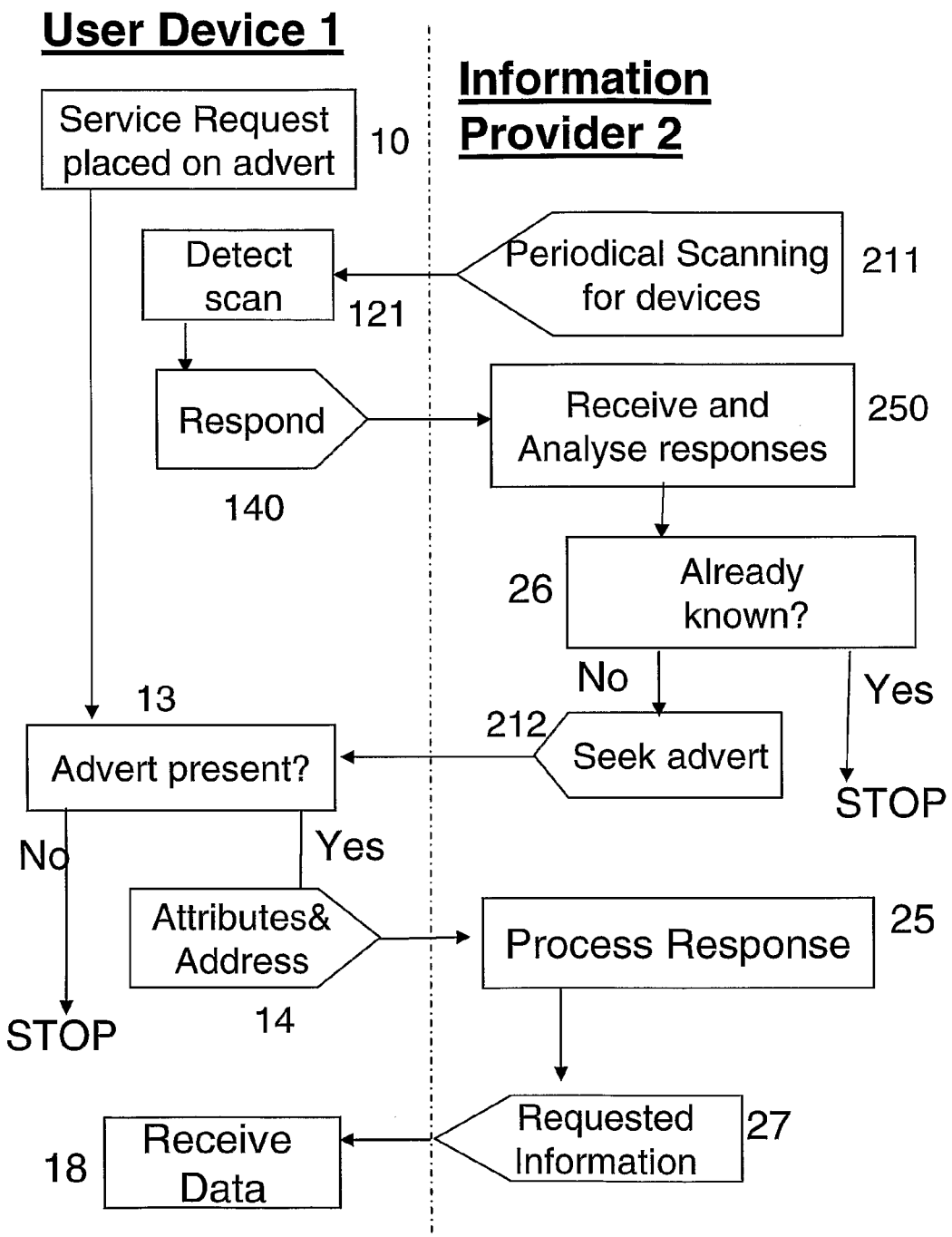
FIG. 4 is a diagrammatic representation of the exchange of data performed between a user device and an information provider point operating according to a first embodiment of the invention.
Figure 5:
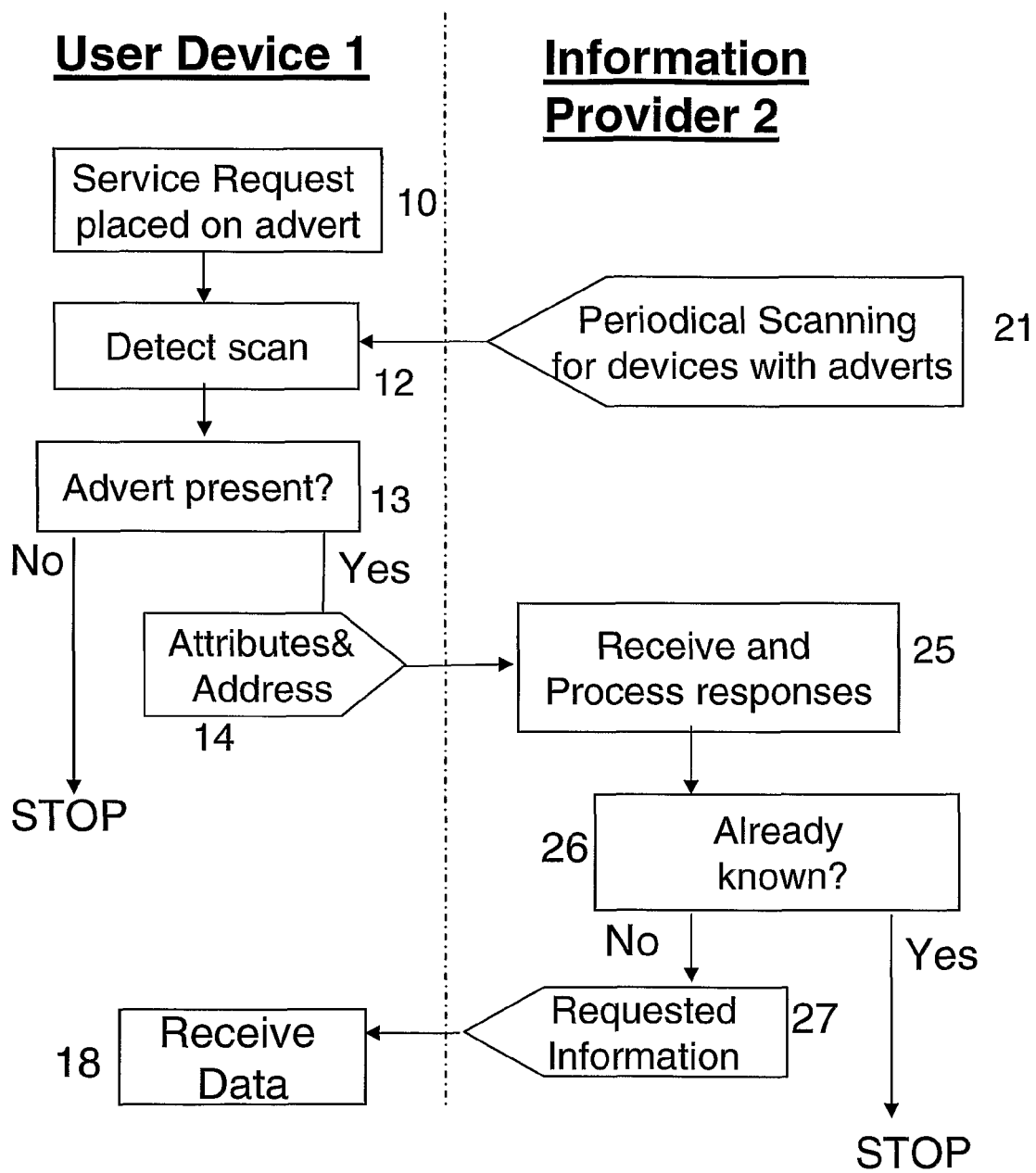
FIG. 5 is a diagrammatic representation of the exchange of data performed between a user device and an information provider point operating according to a second embodiment of the invention.

The embodiment of FIG. 4 is implemented using standard Bluetooth, and the embodiment of FIG. 5 is a simplified version requiring some modification to commonly available Bluetooth APIs. The Bluetooth system provides the lowest power wireless communications commonly available, and the APIs provide convenient functionality with which to implement it. However, other protocols could be used.

In practice there could be any number of user devices (including zero) in range of any given information provider point, and any number (again including zero) of information providers in range of any given user device. However, for simplicity the illustrative example shown in the Figures depict a single user device 1, and a single information provider 2. The behaviour of the user device 1 in the presence of more (or less) than one information provider will become apparent from the following description, as will the behaviour of the information provider 2 in the presence of more (or less) than one user device.

Considering FIG. 1, and as will be discussed in relation to FIG. 7, the user device 1 and the information provider 2 are each associated with a respective wi-fi capability 31, 32.

Figure 2:
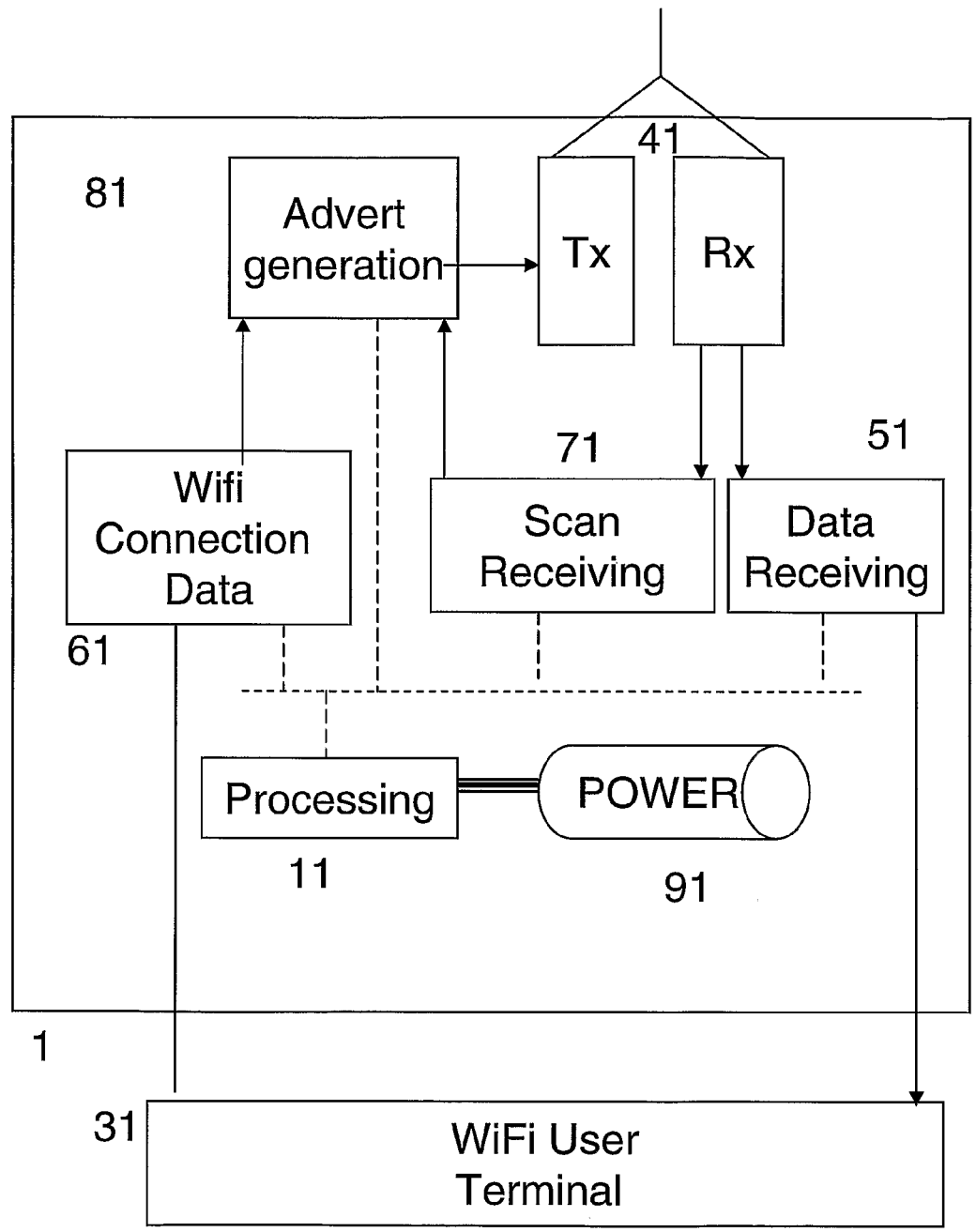
FIG. 2 is a schematic diagram illustrating the functional elements of the user terminal 1 of FIG. 1 in more detail.

The user device 1 is a Java- and Bluetooth-enabled mobile phone, or portable computer running a 'notify-me' MIDlet. It is associated with a wi-fi enabled user terminal 31. As seen in more detail in FIG. 2, the user device 1 has an internal power supply 91 and comprises a central processor 11, which co-ordinates the operation of the other elements. These other elements comprise: a piconet transceiver 41, a means 61 for storing connection data for the wifi terminal 31, data generation means 81 for generating an advertisement derived from the connection data 61, for transmission over the piconet when required, a scan receiving means 71 for identifying scans received over the piconet and controlling the transmission of advertisements from the generation means 81, and data receiving means 51 for receiving data generated by a corresponding device in response to the advertisements.

Figure 1:
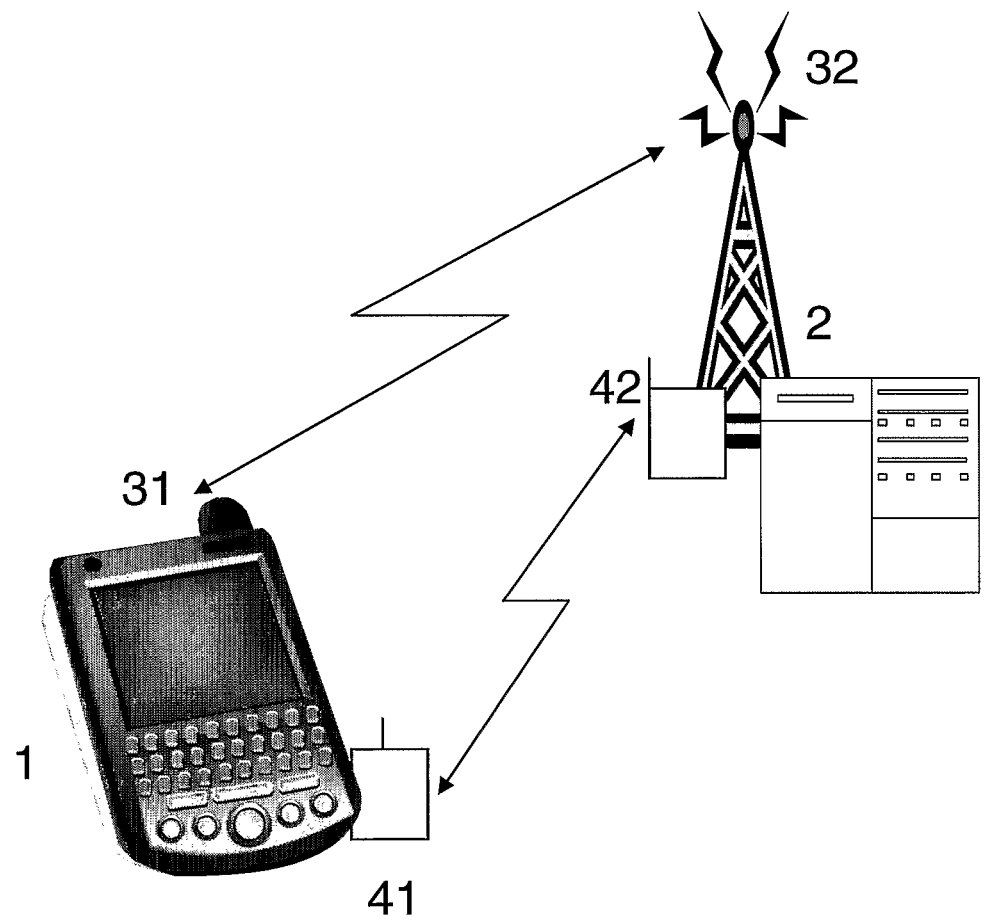
Figure 3:
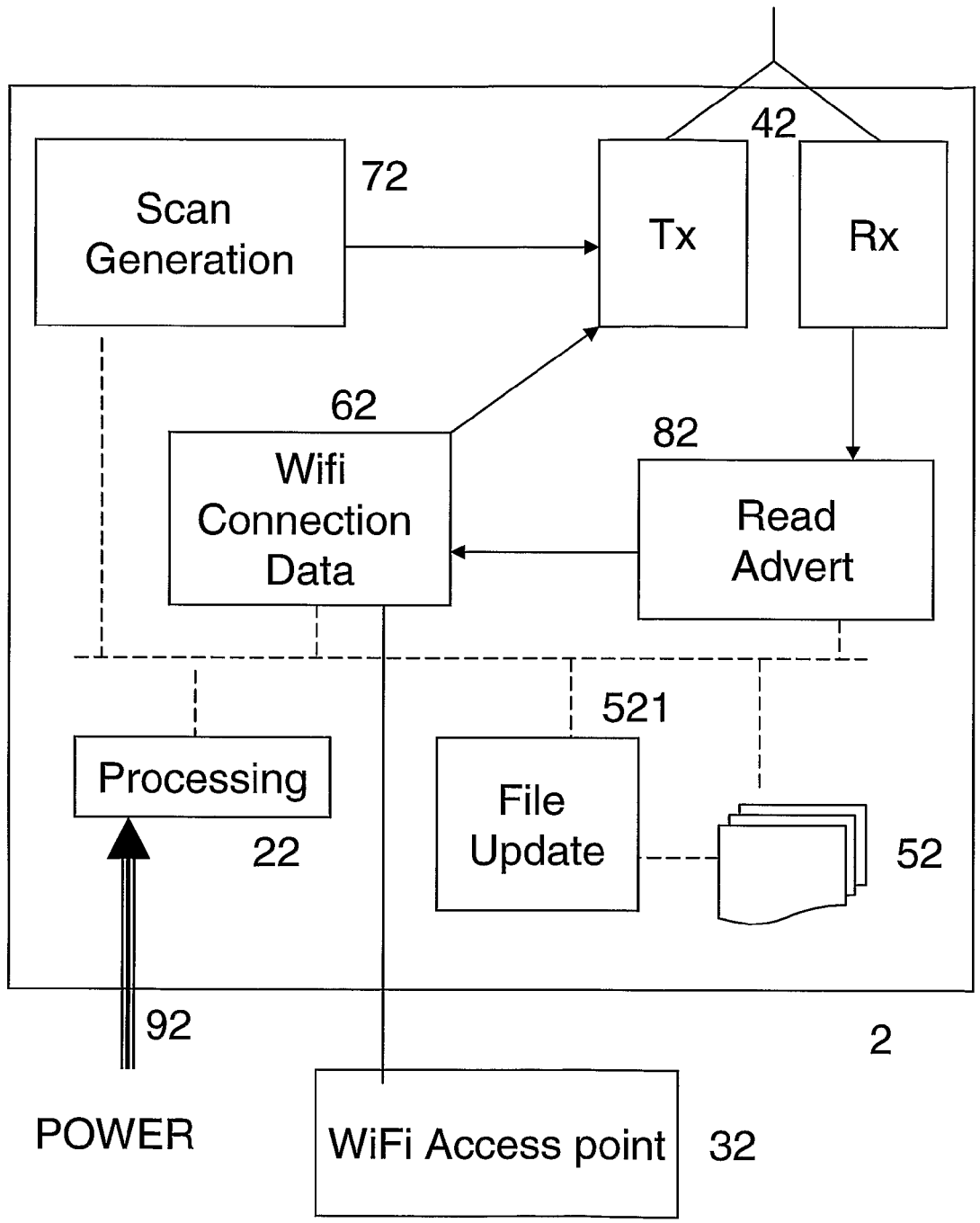
FIG. 3 is a schematic diagram illustrating the functional elements of the information provider point 2 of FIG. 1 in more detail.

Considering FIG. 1 and FIG. 3, the information provider 2 is a fixed device such as a personal computer, or some dedicated device, having an external power supply 92, and wireless hardware 32, operating under the control of a processor 22. The device has a piconet transceiver 42 and runs a Bluetooth 'Information provider'. It has scanning means to generate a scanning signal 72 for transmission by the transceiver 42. The information provider 2 also has a means 82 for receiving data requests received in response to such scans, and data generation means 62 means to generate data relating to the wifi connection 32, in response to such data requests. The information provider 2 is associated with a store 52 for data relating to user devices with which it has previously made contact, which has an associated data upkeep function 521.

The Java MIDlet is chosen for use on the mobile device in this embodiment because it is commonly available on mobile devices, and also because it provides a mechanism to freely distribute the service to a wide range of mobile devices, and a potential mechanism to auto-start its software. However, the device can work in any language that can use the Bluetooth service.

A conventional Bluetooth-equipped mobile device would scan for services that it wants to use, such as a printer or wireless access point. In contrast, according to the present invention, when a user requires information the mobile device 1 runs an application that advertises itself as a recipient of information of a specified nature (step 10). More specifically, in this example, it seeks information about available WiFi access points in the immediate locality. However, unlike prior art systems, the user device does not perform an active search, but passively awaits a prompt from any information provider that may be in the vicinity.

As shown in FIG. 4, an active Bluetooth device seeking a service periodically run scans 211 to identify other Bluetooth-enabled devices in the vicinity. When the Bluetooth-enabled information provider 2 performs such a scan 211, the user device 1 detects the scan (step 121) and responds (140).

The information provider 2, receives this response (step 250) (or potentially several responses from several such devices). It first analyses the response to determine if the mobile device 1 was previously known to it (step 26). This process is shown in more detail in FIG. 6, and will be discussed later.

If a response is received from a device 2 not previously known to the information provider 1 it now sends a challenge 212 to the newly-discovered device 2 to determine whether its is running the notification-reception application. The challenge signal 212 gives only the fact that it is seeking the notification-reception service, and a return address. Additionally it might send some kind of mutually recognised 'token' to prove that it is genuine. Any device 1 within range that detects the challenge signal (212) assesses it (13) to determine if the service request (advertisement) 10 stored on the device 1 matches that in the challenge signal 212. If the challenge 212 is determined to be relevant the mobile device 1 generates a response 14 in the form of the publishable request, which takes the form of a profile of the type of information it requires, and its own return address. It may also return an equivalent 'token' to prove that it also is genuine identification code.

In this embodiment, these two steps are performed by the direct use of the Bluetooth Service Discovery protocol to broadcast requests for a specific 'service'. In conventional usage, the device seeking information looks for a server that will provide it. In a reversal of that usage, the information provider 2 in the present embodiment is the 'client' looking for a service, and the mobile device 1 is a server, providing an "information reception service".

The information provider 2, on receiving a response 14 indicating that the user device 1 requires the information on offer, identifies the data required (step 25) and provides the requested data (step 27) over the Bluetooth connection, where it is received by the user device (step 18).

The initial contact stage 211, 121, 140, 250 of FIG. 4 is necessary under existing Java APIs, before the information provider 2 can interrogate the user device (step 212) about the services it offers. The list 52 therefore has to maintain a record of all user devices in the vicinity, to determine whether they have been interrogated in this way.

A simpler variant of this embodiment is depicted in FIG. 5, in which the information provider 2 is able to scan (step 21) for user devices carrying publishable advertisements without the initial contact stage 211, 121, 140, 250 of FIG. 4. This scan 21 is detected by the user device 1 and, if an appropriate advertisement is present (step 13) the process then continues (14, 25) as in the first embodiment, consulting the list 52 (step 26) to determine if a response 27 is to be sent. In this case, the list 52 only needs to record devices advertising for the information service, as these are the only devices which respond to the initial scan 21.

Figure 6:
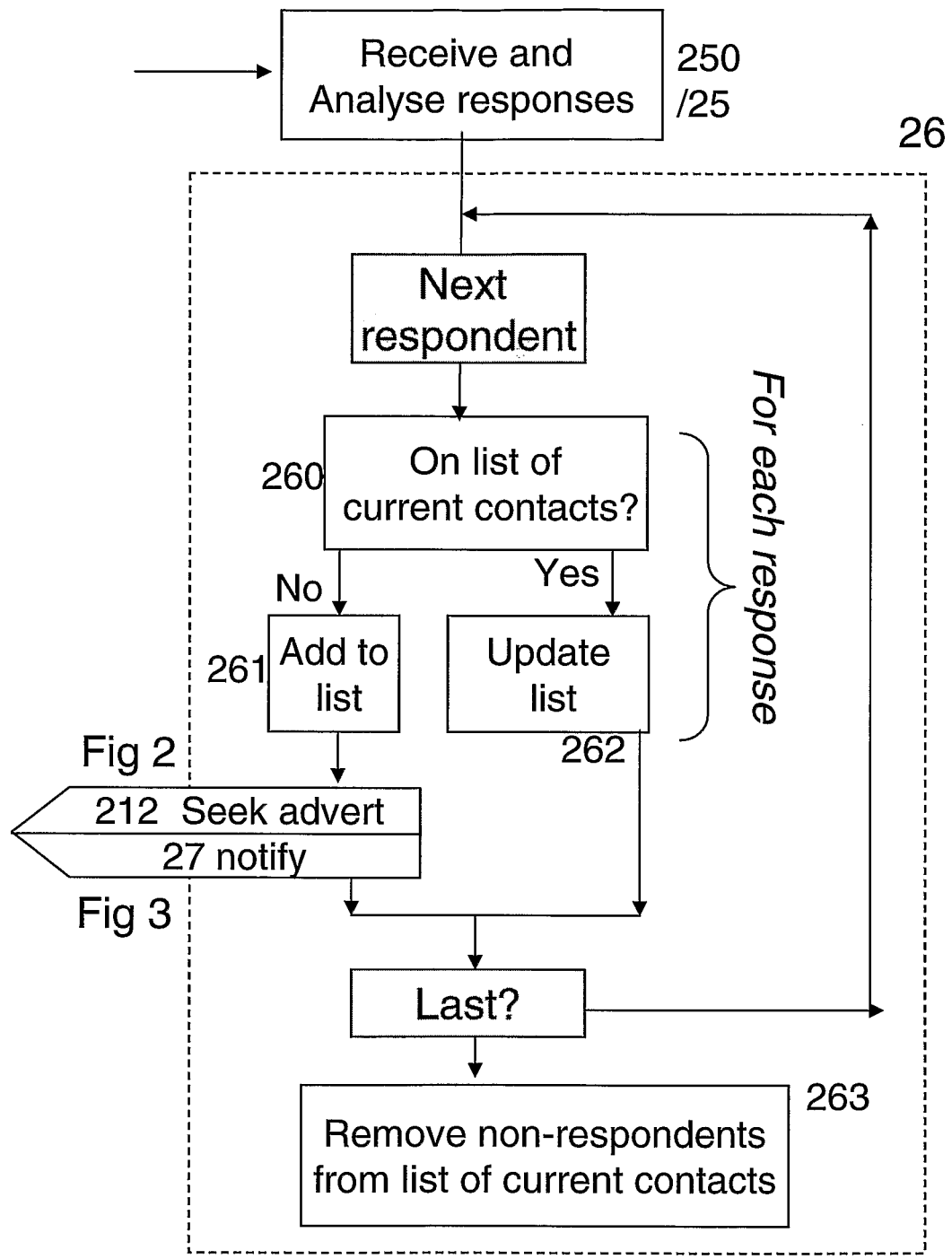
FIG. 6 is a diagrammatic representation of the contact list update process performed by the information provider point of FIG. 4 or FIG. 5

FIG. 6 illustrates the process 26 by which the information provider 2 maintains a record 52 of the results of each scan and the resulting information transfers so that it does not repeat the sending of information to devices that have already received it. It performs a comparison 24 of each response 250 (FIG. 4), 25 (FIG. 5) it receives against the list 52. If a response is received from a device that is not currently listed, it is added to the list 52 of current contacts (step 261) and the notification process continues (step 212, 27). However, if a response is received from a device 2 already on the list, no notification is transmitted. The information provider 2 updates the list 52 (step 262) to indicate that the device 1 is still responding. This process is repeated for each device that responded to the scan. Prior to running the next scan 22, any devices which have not been updated from the existing list are removed from the list of current contacts (step 263).

In a variation, the update process 52 is modified such that a device is only removed from the list 52 if responses to a predetermined number of successive scans fail to be received from that device. Moreover, some residual record may be maintained for a predetermined period after a device is lost, in order to facilitate re-establishment of a connection should the device come back into range.

This discovery and sending process repeats at regular intervals, avoiding re-sending information to applications that have already received it, and noting any devices that cease to be rediscovered within some certain minimum time. These are assumed to have left the proximity of the information provider 2 and can be renotified if they later come back into range.

Optionally, the information provider 2 can check whether any other devices it discovers have at some time in the past registered with a central service to receive notifications about certain services. If so it can notify those as well, by means of an OBEX or similar push, as used to transfer vCards between devices.

In this invention, connection information such as urls, or other data, are not broadcast indiscriminately, but are only transmitted to devices that have already acknowledged that they want to receive them, and they can be customised to the device/application. This prevents the feature being used for "spamming" or 'hijacking' passing devices.

The mobile device 1 can use other details (such as time-of-day, diary entries, or habitual patterns) to determine whether to advertise 10. Similarly the service informer 2 can use such details to determine whether to notify availability 21, 211.

The invention may be used to supply any information that the user 1 may require and the information provide 2 has available. However, it has particular application in establishing a wireless link such as a "wi-fi" (IEEE 802.11 standard) link. This is illustrated in FIG. 7.

Each access point in the wifi network generates data 320 and periodically scans 21 (212) to identify devices requiring this data.

Figure 7:
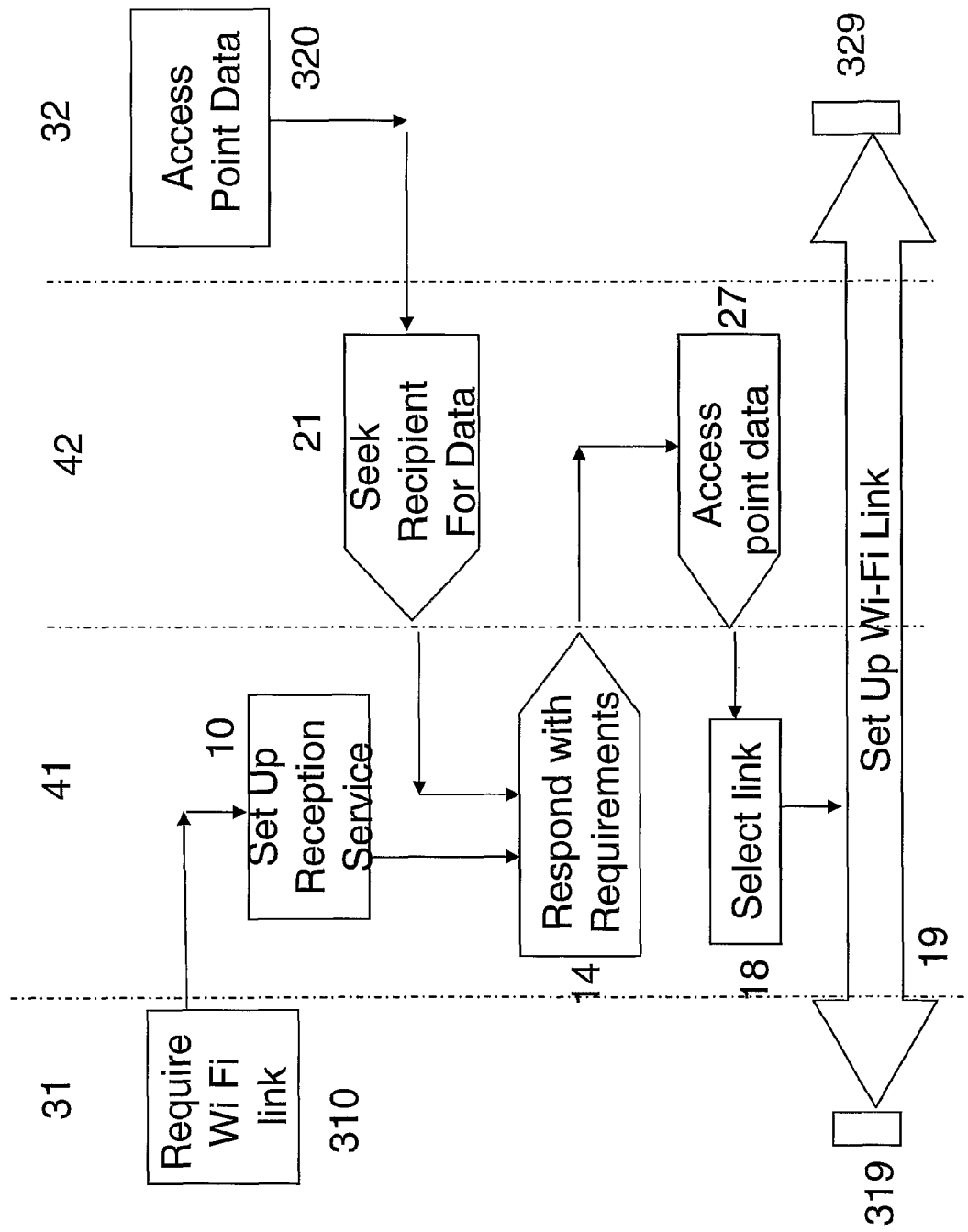
FIG. 7 is a diagrammatic representation of the use of the invention to establish a communications link between a user device and a wireless access point It should be noted that FIGS. 2 and 3 are representations of the functional elements that co-operate to operate the devices. These elements may be embodied on a general purpose computer, integrated circuit, etc.

As shown in FIG. 7, the wifi function 31 of the user device 1 determines that it requires a connection (step 310) and sets up the piconet reception service (step 10) to identify what information is available locally about such connections, meeting criteria set by the user device. These may set minimum requirements for bandwidth, service quality, price, etc. If the user device 1 is already using a wireless link, these requirements may be defined with reference to the properties of the existing link, so that handover is performed if (and only if) an improvement is possible. The information provision process is carried out as described with reference to FIG. 4 or FIG. 5 (as indicated in outline in FIG. 7—steps 10, 21, 14, 27, 18). The user device 1, having received notification 27 about application configuration and URLs/credentials of wireless access points 32 that it may be able to use, is now in a position to set up the desired communications link between its own associated wifi application 31 and the access point 32 associated with the information provider 2.

It can therefore instruct its associated wi-fi functionality 319 to set up a wi-fi link to the wi-fi access point 32 (step 19), which provides access to the wi-fi network 329. The mobile device 1 may use further information to assist or refine the process, such as CellID, signal strength, GPS location (and rate of change/direction of location). This information allows the fixed wifi terminal 32 to set up a wireless connection to the user device 31.

Other enhancements can be added to the basic system. For example, the notification service can use variable details beyond simple availability, such as time of day, network cost/loading/QoS, device priority or privilege to decide whether to notify any particular device of any particular service. It can also advertise the presence of other nearby mobile devices (e.g. of friends or colleagues).

The invention may be used to provide any information that the user wishes to receive. For example, other information relating to accessibility of communications capabilities may be transmitted to the user in response to the initial advertisement, such as the presence of a physical Ethernet jack, or the address of a SIP presence server, or a VoIP server. The service may also be used to notify the user device that a newer version of an application it is running is now available. More generally, the invention may be used to supply information about other services or products available, for advertising or alerting purposes and the like. However, because the process is initiated only if the user device is advertising for such information, it remains in the control of the user as to what information is downloaded.

The invention claimed is:
1. A method of operating a wireless communications system wherein:

at least one device of a first type generates a transmittable request for a specified data type, at least one device of a second type generates and transmits a scanning signal indicative that the device seeks devices of the first type requiring information, and on detection of the scanning signal, a device of the first type transmits the request to the device of the second type specifying the data required, and on receiving the request, the device of the second type determines whether it has data of the type specified in the request and, if it has such data, transmits it to the device of the first type.

2. The method according to claim 1, wherein the device of the first type is a mobile device with an internal power supply and the device of the second type is a fixed device connected to an external power supply.

3. The method according to claim 1, wherein the communications system is a piconet operating a reversed service-discovery protocol, wherein the device of the first type operates as a server, providing a service as a receiver of information, and the device of the second type acts as a client seeking such a service.

4. The method according to claim 1, wherein the device of the second type maintains a record of the identities of each device of the first type to which it transmits data, and in the event of a subsequent request being received from a device of the first type whose identity has been so recorded, the device of the second type does not transmit the same data to the device of the first type.

5. The method according to claim 4, wherein if the device of the second type fails to make contact with a device of the first type with which it has previously made contact after a predetermined number of attempts, it removes the device of the first type from the record so that it can resume transmitting data to the device of the first type should it subsequently be re-discovered.

6. The method according to claim 1, wherein the specified data is configuration data to be used by the device of the second type to run a predetermined application.

7. The method according to claim 6, wherein the specified data relates to wireless connection of a user terminal associated with the device of the first type to a wireless access point associated with the device of the second type.

8. A communications device-having data generation means for generating a transmittable request for specified data, a scanner for detecting a scanning signal generated by a corresponding communications device and indicative that the corresponding device seeks devices requiring information, a transmitter for transmitting the request for specified data to the corresponding communications device in response to the scanning signal, and a receiver to receive the required data, if available, from the corresponding communications device.

9. The communications device according to claim 8, being a mobile communications device with an internal power supply.

10. The communications device according to claim 8, configured to operate a reversed service-discovery piconet protocol, wherein the device operates as a server, providing a service as a receiver of information.

11. The communications device according to claim 8, wherein the specified data is configuration data to be used by the device to run a predetermined application.

12. The communications device according to claim 11, wherein the specified data is data to be used for wireless connection of a mobile user terminal (31) associated with the device (1) to a wireless access point (32) associated with a corresponding device (2).

13. A communications device for transmitting data to corresponding devices, comprising:
a scanner for generating and transmitting a scanning signal, the scanning signal being indicative that the device seeks corresponding devices requiring information and which, on detection by a corresponding device, will cause such corresponding devices to transmit a request for specified data, a receiver for receiving and processing such requests, data processing means responsive to requests processed by the receiver for analysing such received requests and determining whether the device can provide the specified data, and data transmission means responsive to the data processing means for transmitting the specified data, if available, to the corresponding device.

14. The communications device according to claim 13, wherein the device is a fixed device having a connection to an external power supply.

15. The communications device according to claim 13, configured to operate a reversed service-discovery piconet protocol, wherein the device operates as a client, seeking corresponding communications devices acting as servers providing an information-reception service.

16. The communications device according to claim 13, having data storage means to record the identities of corresponding devices to which it transmits data, and means for preventing the transmission of the same data to a corresponding device whose identity has been so recorded in the event of the same request subsequently being received from the same device.

17. The communications device according to claim 16, comprising data updating means for removing a record of a corresponding device from the data storage means in the event that the corresponding device fails to make contact after a predetermined number of transmission scans, so that it can resume transmitting data to the corresponding device should it subsequently be rediscovered.

18. The communications device according to claim 13, wherein the specified data is configuration data to be used by the corresponding devices to run a predetermined application.

19. The communications device according to claim 18, wherein the specified data is data to be used for wireless connection between a wireless access point associated with the device and a user terminal associated with the corresponding device.

* * * * *